INVENTORS.
A. PHILIP SCHNEIDER AND
MARY LEE SCHNEIDER.
BY
ATTORNEY.

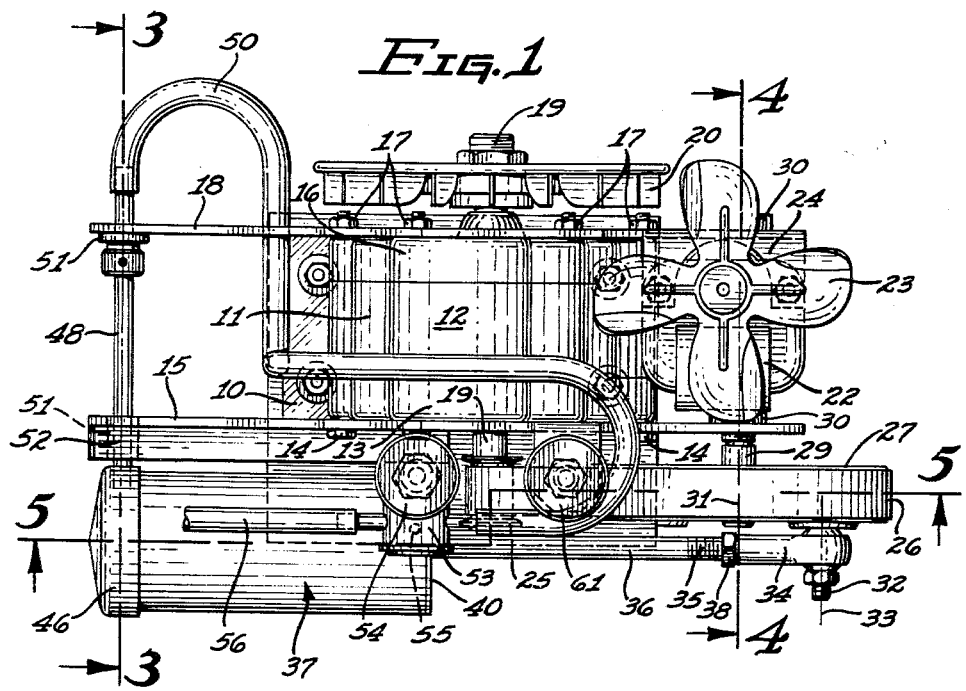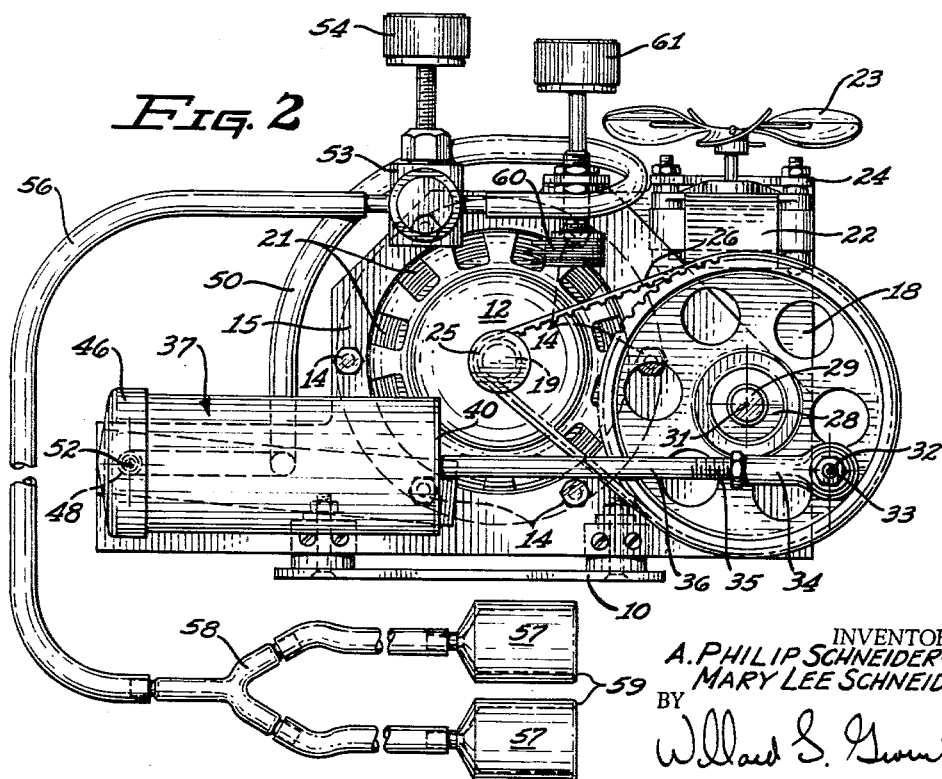

United States Patent Office 3,236,231
Patented Feb. 22, 1966

3,236,231
FACIAL UPLIFT APPARATUS EMPLOYING
VACUUM CUPS
A. Philip Schneider and Mary Lee Schneider, Phoenix, Ariz., assignors to Mary Lee Way Corporation, Los Angeles, Calif., a corporation of Arizona
Filed Dec. 27, 1962, Ser. No. 247,620
1 Claim. (Cl. 128—40)

This invention pertains to apparatus for treating the skin and is particularly directed to devices for facial uplift treatment.

One of the objects of this invention is to provide apparatus for effecting facial uplift without surgery.

Another object of this invention is to provide a device for intermittently subjecting the skin of a person to vacuum suction and release, particularly for facial uplift without surgery.

A further object is to provide a facial uplift machine particularly adapted to apply and release suction by suction cups applied to the skin so as to manipulate the skin for removal of sag, wrinkles and other similar undesirable characteristics so as to enhance the beauty and appearance of a person.

And a still further object is to provide a motor drive vacuum pump to provide a pulsating suction at one or more suction cups applicable to a person's skin together with means to vary the amount of pulsating suction during the operation of the device.

Further features and advantages of this invention will appear from a detailed description of the drawings in which:

FIG. 1 is a plan view of a facial uplift apparatus incorporating the features of this invention.

FIG. 2 is a front elevation of the apparatus shown in FIG. 1.

Figure 3:
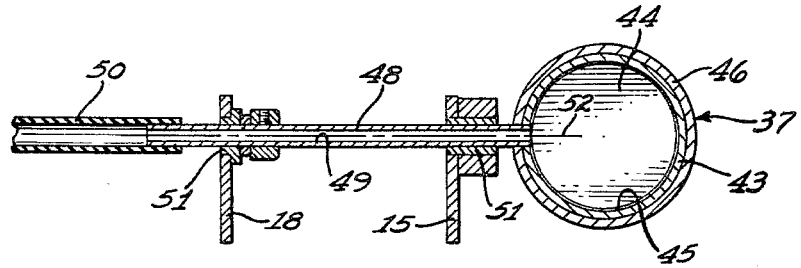
FIG. 3 is an enlarged sectional view on the line 3—3 of FIG. 1.
Figure 4:
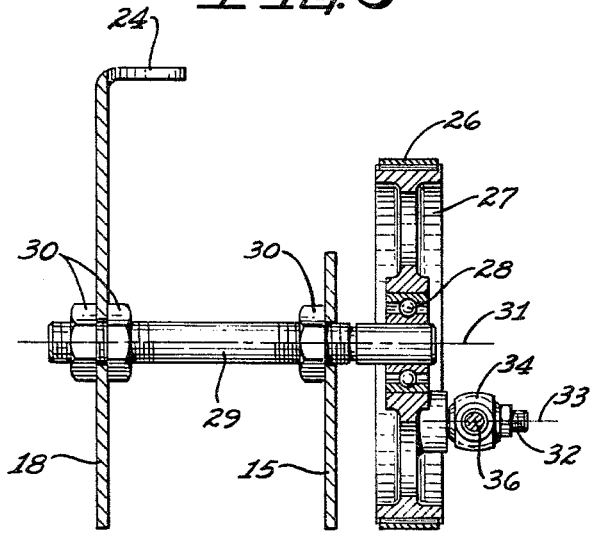
FIG. 4 is an enlarged sectional view on the line 4—4 of FIG. 1.
Figure 5:
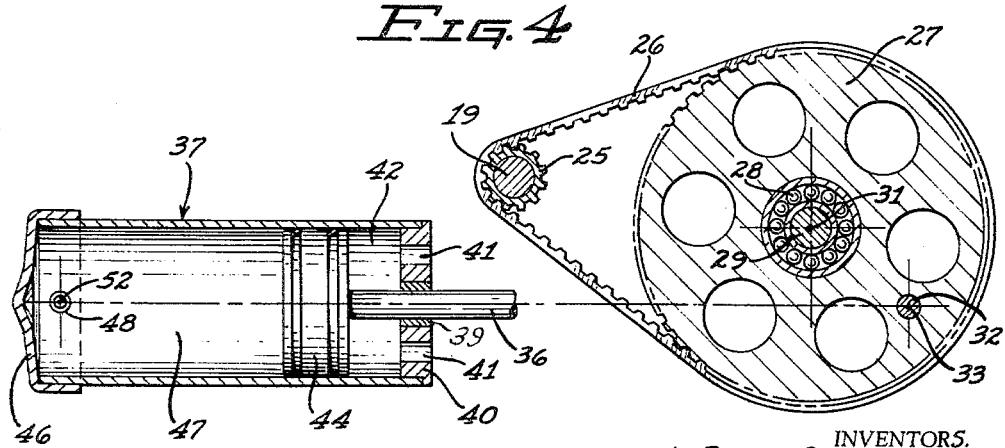
FIG. 5 is an enlarged sectional view on the line 5—5 of FIG. 1.

As an example of one embodiment of this invention there is shown a facial uplift machine comprising a frame having a base plate 10 upon which is fixed the main housing 11 of the drive motor 12. Fixed to the front end bell 13 of the motor 12 by suitable bolts 14 is the vertically disposed front plate 15 and fixed to the rear end bell 16 of the drive motor 12 by suitable bolts 17 is the vertically disposed rear plate 18.

On the rear end of the shaft 19 of the drive motor 12 is fixed a suitable ventilating fan 20 adapted to draw air through suitable ventilating slots 21 formed in the end bells 13 and 16 for cooling the motor 12. An auxiliary ventilating motor 22 having a suitable ventilating fan 23 is mounted on the turned over horizontal portion 24 of the rear plate 18.

Fixed on the front end of the drive motor shaft 19 is the belt pulley 25 over which operates the belt 26 which in turn operates over the crank pin wheel 27 journaled against axial movement on a suitable anti-friction bearing 28 having its inner race on a suitable support shaft 29 fixed in the plates 15 and 18 by the nuts 30 so that the crank pin wheel 27 revolves about an axis 31.

A crank pin 32 having an axis 33 is fixed near the periphery of the crank pin wheel 27 upon which is journaled the connecting rod link 34 threadedly connected at 35 and locked to the piston rod 36 of the vacuum pump 37 by a suitable lock nut 38. The piston rod is guided for axial sliding movement in a guide bushing 39 in the front cylinder head 40 having openings 41 therethrough for free flow of air into and out of the rod end chamber 42 in the pump cylinder 43. A piston 44 is fixed to the inner end of the piston rod 36 and is axially reciprocatable in the bore 45 of the cylinder 43. A rear cylinder head 46 closes the rear end of the cylinder 43 to form the piston head chamber 47 of the vacuum pump 37.

A combined rockshaft and air connection pipe 48 is extended radially and is fixed in the rear end of cylinder 43 and in cylinder head 46 and has a bore 49 communicating with the piston head chamber 47 of the pump and a flexible pipe 50. The member 48 is journaled in suitable bearings 51 in the plates 15 and 18 so that the cylinder 43 may rock around the axis 52 as the motor 12 drives the crank pin wheel reciprocating the piston rod 36 and piston 44 in the cylinder 43. The flexible pipe or rubber hose 50 is connected to a vacuum control valve 53 suitably mounted on the front plate 15 and having a control knob 54 operable to vary the amount of atmospheric air drawn in through or escaping from a port 55 to vary the suction in the applicator line of flexible hose 56 to which are attached one or more suction cups 57 through a suitable branched pipe fitting 58 having lips 59 adapted to be placed in sealed contact with a person's skin. A suitable electric "on" and "off" switch is mounted on the front plate 15 and has a control knob 61 for controlling the energizing and de-energizing of the motors 12 and 22. Thus, as the piston 44 reciprocates in the cylinder 43 of the pump 37 an increase and decrease in vacuum takes place in the chamber 47, in the line 56 and in the suction cups 57 when placed against the skin thus causing the skin to be stretched and released continuously during the operation of the machine to effect the desired conditioning of the skin as the cups 57 are moved about the area to be treated.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appendant claim are intended to be included herein.

Having thus fully set forth and described this invention what is claimed and desired to be obtained by United States Letters Patent is:

A skin treating apparatus comprising in combination:
(a) a frame having a base plate,
(b) a drive motor having a main housing mounted on said base plate,
(c) a vertically disposed front plate fixed to the front end of said motor,
(d) a vertically disposed rear plate fixed to the rear end of said motor,
(e) a shaft in said motor,
(f) a ventilating fan fixed on the rear end of said motor shaft,
(g) a drive pulley on the front end of said shaft,
(h) a crank pin wheel journaled on said front and rear plates to one side of said motor shaft,
(i) a belt connected between said drive pulley and said crank pin wheel whereby said wheel is driven by said motor,
(j) a vacuum pump having
(k) a cylinder pivotally mounted on said front and rear plates on the opposite side of said motor shaft from said crank pin wheel,
(l) a piston reciprocable in said cylinder,
(m) a piston rod connected to said piston extending outwardly in front of said motor from said cylinder,
(n) a crank pin on said crank pin wheel pivotally connected to the outer end of said piston whereby rotation of said crank pin wheel by said motor causes reciprocation of said piston in said cylinder while rocking the open end of said cylinder in front of said motor on its pivotal mounting on said front and rear plates of said motor of said frame, (o) said pivotal mounting of said cylinder on said frame comprising a combined single rockshaft and common air supply pipe journaled on said frame and rigidly connected to the piston head end of said cylinder, (p) a flexible pipe connected to the opposite end of said air supply pipe from its connection with said cylinder, (q) and suction skin engaging cups connected to the other end of said flexible pipe.

References Cited by the Examiner
UNITED STATES PATENTS

| | | | |
|---|---|---|---|
| 841,146 | 1/1907 | Hasbrouck | 128—40 |
| 1,179,129 | 4/1916 | Maxam | 128—38 |
| 1,644,257 | 10/1927 | Lasker | 128—281 |
| 2,646,038 | 7/1953 | Iwan | 128—40 |

RICHARD A. GAUDET, *Primary Examiner.*